(12) United States Patent
Gierling

(10) Patent No.: US 6,251,043 B1
(45) Date of Patent: Jun. 26, 2001

(54) DEVICE FOR CONTROLLING AN AUTOMATIC TRANSMISSION

(75) Inventor: Armin Gierling, Langenargen (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/432,659

(22) Filed: Nov. 3, 1999

(30) Foreign Application Priority Data

Nov. 6, 1998 (DE) .............................................. 198 51 160

(51) Int. Cl.[7] .............................. B60K 41/04; F16H 59/14
(52) U.S. Cl. ............................. 477/115; 477/43; 477/902
(58) Field of Search ................................ 477/43, 50, 115, 477/902

(56) References Cited

U.S. PATENT DOCUMENTS

| | | | |
|---|---|---|---|
| 3,686,941 | * | 8/1972 | Kramasz, Jr. et al. ............. 73/117.3 |
| 3,799,001 | * | 3/1974 | Takagi et al. ........................ 477/158 |
| 3,800,599 | * | 4/1974 | Goran ...................................... 73/116 |
| 3,882,740 | * | 5/1975 | Förster et al. ........................ 477/902 |
| 3,886,817 | * | 6/1975 | Paul et al. ............................. 477/115 |
| 3,903,738 | * | 9/1975 | Malchow ........................... 73/862.29 |
| 4,715,145 | * | 12/1987 | Takeda et al. .......................... 477/63 |
| 4,736,301 | * | 4/1988 | Osanai .................................... 477/43 |
| 5,521,819 | * | 5/1996 | Greenwood ............................ 477/50 |

FOREIGN PATENT DOCUMENTS 0 584 457 A1  3/1994 (EP).
0 584 457 B1  3/1994 (EP).

* cited by examiner

Primary Examiner—Sherry Estremsky
(74) Attorney, Agent, or Firm—Davis & Bujold, P.L.L.C.

(57) ABSTRACT

The device for the control of an automatic transmission, especially a CVT, which is connected with an oscillatingly suspended drive mechanism, preferably an internal combustion engine for a motor vehicle with front-transverse drive mechanism, wherein the transmission has an electronic control, is provided with a sensor in the form of a piezoceramic transmitter on a torque support for the drive mechanism for producing high dynamic, to provide engine-torque equivalent signals which are fed to the electronic transmission control.

13 Claims, 2 Drawing Sheets

DEVICE FOR CONTROLLING AN AUTOMATIC TRANSMISSION

FIELD OF THE INVENTION

This invention concerns a device for controlling an automatic transmission, particularly of a CVT, which is connected with an oscillatingly suspended drive mechanism, specially an internal combustion engine for a motor vehicle with front-transverse drive mechanism wherein the transmission has an electronic control for shift pressure control of the transmission clutches and of the contact pressure control of the transmission variator as a function of engine-torque equivalent signals transmitted to them by a sensor.

BACKGROUND OF THE INVENTION

Electronically controlled automatic transmissions (stepped automatic machines and CVT) for motor vehicles need engine-torque equivalent signals for shift pressure control and shift pressure regulation of the clutches and/or for contact pressure control or contact pressure regulation of the variator. The more accurate said engine-torque equivalent signals are, the more exactly can be calculated and then hydraulically adjusted the clutch pressures or variator contact pressures required for positive transmission. In this manner, on one hand, the hydraulic system pressure can be adjusted as low as possible and thus the pumping power of the transmission can be reduced in favor of efficiency and, on the other hand, shift operations of the clutches can be more comfortably adjusted. Another advantage results, specially for a CVT, by noticeable improvements in efficiency of the variator by controlling the slip limit. A CVT is a transmission having one variator for continuous adjustment of the drive ratio. A known design is a continuously variable variator with a first beveled pulley pair on an input shaft and a second beveled pulley pair on an output shaft. Each beveled pulley pair consists of a first pulley stationary in its axial direction and one second pulley movable in axial direction, respectively called also primary pulley and secondary pulley. Between the beveled pulley pairs runs a continuously variable organ such as a sliding link belt. The primary pulley and secondary pulley are adjusted by a pressure medium; to this end an electronic control unit controls via electronic actuators and hydraulic valves the pressure level of the adjustment chambers of primary pulley and secondary pulley according to input torque and the driver's desired ratio adjustment.

The precision required from the engine-torque equivalent signal applies here both to the absolute value and to the dynamic characteristic of the engine torque, e.g. during a load change.

Engine-torque dependent signals, which are known already, are based on the thermodynamic foundations of the combustion characteristic of the prime mover. The torque generated on the crankshaft as function of the induced average pressure is either measured and deposited in the engine control as a performance graph for the engine rotational speed, the air mass, the injection time or the throttle valve position, or is calculated as thermodynamic pattern. On the basis of this performance graph and the actual operation parameters, the engine control delivers an actual engine torque signal to other control units such as the transmission control, however, the actual torque thus produced depends on numerous disrupting influences and/or tolerances thus is relatively inaccurate.

EP A 584 457 has disclosed a device for regulated engagement and disengagement of the master clutch in the transmission of a motor vehicle comprised of one engine and one eletrohydraulically actuatable automatic transmission in which to detect the connection between the driving device and the body, the disconnection zone of the driving device is measured compared to the body and fed to a transmission control device which adjusts the control pressure in the master clutch of the transmission in specific driving situations in a manner such that the master clutch starts to slip. The output torque of the transmission from information of the supporting force in the supporting bearings of the driving device can be used to control the master clutch instead of the disconnection zone of the driving device. The transmission is designed as an eletrohydraulically controllable automatic transmission actuatable via an electrohydraulic control device which receives it s control command from the transmission control device and form a sensor for measuring the force in the supporting bearings for the driving device. With this known device a master clutch can be engaged and disengaged, e.g. to reduce the static vibration, exclusively when the vehicle is parked in the selected gear and when the driving wheels are braked.

SUMMARY OF THE INVENTION

The problem on which the invention is based is to provide a device for control of an automatic transmission 2, in particular of a CVT, which is connected with an oscillatingly suspended drive mechanism, specially an internal combustion engine 4 for a motor vehicle, with front-transverse drive, in which the preparation of the engine-torque equivalent signals for the electronic transmission control 6 is ensured with substantially better accuracy and higher tolerance insensitivity both for starting up and for dynamic operation states.

BRIEF DESCRIPTION OF THE DRAWINGS

The invention will now be described, by way of example, wit reference to the accompanying drawings, in which.

Figure 1:
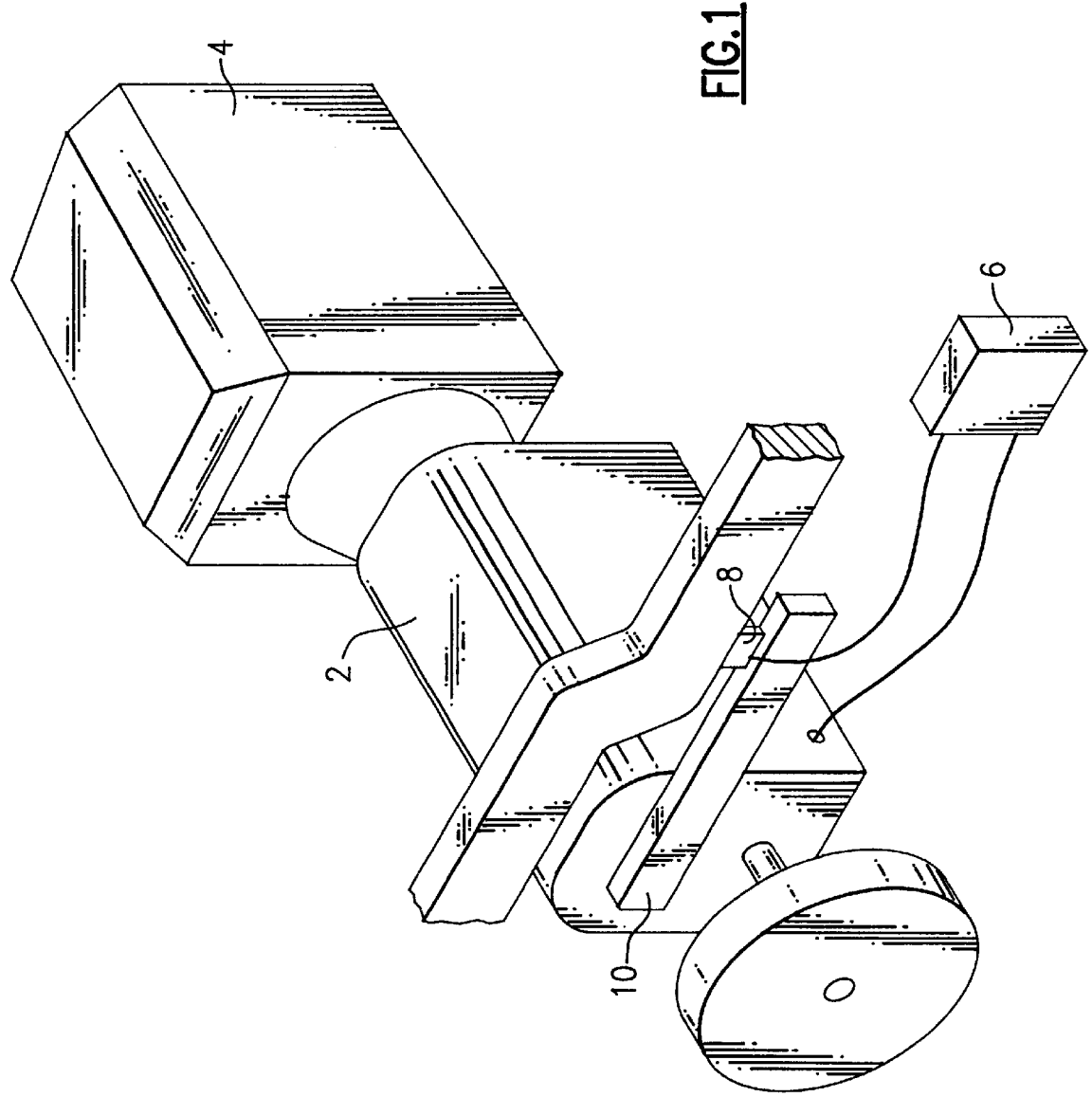
FIG. 1 is a perspective view of the measurement location and orientation of the piezo pressure sensor in conjunction with the CVT transmission utilized in combination with an engine and drive train.
Figure 2:
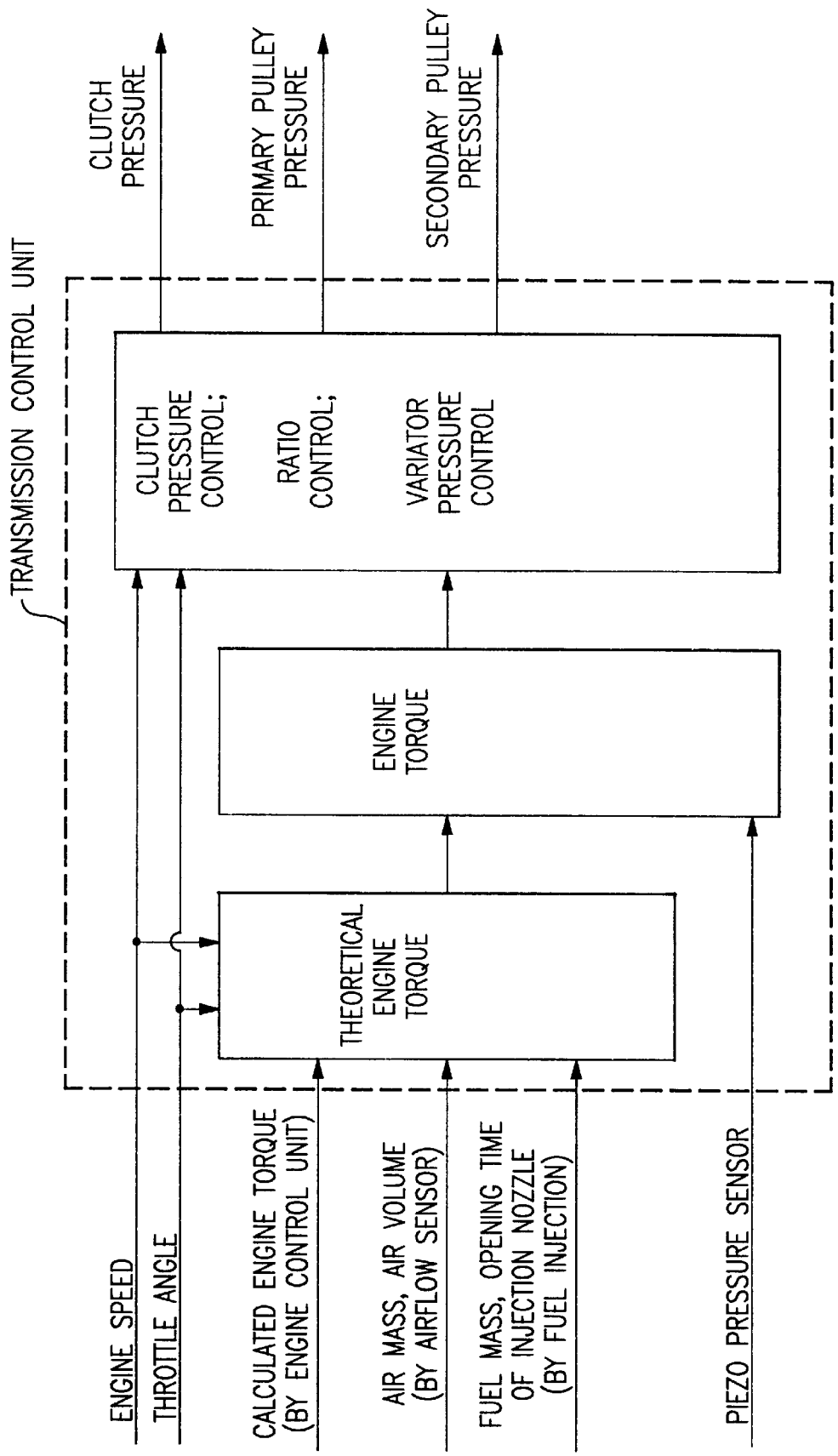
FIG. 2 is a block diagram of the logic structure and variables measured by the piezo pressure sensor in conjunction with the outputs and controls effected thereby.

Departing from a device of the kind specified above, the problem is solved by the present invention.

DESCRIPTION OF HE PREFERRED EMBODIMENTS

According to the invention, therefore, for vehicles, particularly passenger cars with front-transverse drive mechanism oscillatingly suspended, as pressure transmitter is used a piezoceramic sensor 8 which is situated on the torque support 10 for the drive mechanism and measures the supporting force of the oscillatingly suspended drive mechanism as a function of time, for the conversion to a transmission input torque.

The device according to the invention is based on the mechanics and physics of the torque support. The torque actually generated by the internal combustion engine at each operation point manifests itself in the oscillating bearing of the drive mechanism on the torque support 10 (usually single). The force abutting here gives information both about the absolute strength of the engine torque and about the dynamics of the torque change, for ex., during load change.

According to the invention the supporting force is determined by means of a piezoceramic pressure transmitted directly on the torque support whereby the high requirements regarding static and dynamic accuracy of measurement including fatigue strength of the sensor are satisfied. The supporting force is measured as function of time, the correlation to transmission input torque being calculated via calibration points, that is, via a known association of discrete static engine operation points (rotational speed, load temperature, etc.) with the statically produced supporting forces resulting therefrom.

In the simplest case the actual transmission input torque can be calculated by the knowledge of less typically used calibration points from the measured supporting force. Regardless of the quantitative torque accuracy, a very good relative dynamic signal accuracy results, that is, the transmission control 6 can react with very find sensitivity to the dynamic torque changes with the corresponding variator contact pressure.

The static (quantitative) torque accuracy can be improved by different methods of supporting force alignment.

On one hand, the possibility exists, upon the first starting operation of the vehicle (e.g. upon the belt removal at the manufacturing plant), of aligning the theoretical supporting forces in the calibration points defined by the engine operation by moving of the static calibration points. An adaptation of the first alignment in subsequent operation is possible for taking into account the pattern-dependent scattering and inflow effects.

On the other hand, the possibility exists that an automatic alignment occurs while driving when reaching or passing through the calibration points including pattern-dependent long-term adaptation. If there are no special requirements relative to the static (quantitative) signal excellence, e.g. based on the static quality of the torque signal furnished by the engine control, a simple alignment of the static transmission input torque calculated from the supporting force in the calibration points with the corresponding torque of the engine control will be sufficient.

The engine-torque equivalent signal produced according to the invention by the piezoceramic transmitter 8 on the torque support 10 of the drive mechanism is a genuine analog signal with high precision in the dynamic operation implied by the use of a piezoceramic transmitter 8. Contrary to the known methods of engine torque calculation as have been mentioned above, a dynamic imprecision of the actually generated engine torque in relation to the calculated engine torque and computation transit time problems of the engine electronics have no negative effect on the excellence of the signal in the device and process according to the invention, since the engine reaction is similarly available directly as reaction force on the measuring station.

In a CVT an exact signal is available for calculation of the contact pressure of the variator, the high dynamic signal quality makes possible a variator operation on the slip limit even in the dynamic operation.

In addition the quality of the dynamic transmission input torque makes possible a considerable improvement in comfort during shifting operations, specially in connection with this clutch pressure regulation, e.g. of the master clutch or of the converter lock-up clutch of a converter automatic transmission.

Besides, the engine-torque equivalent signal received and used according to the invention can also be used for targeted damping of rotational vibration, for ex., in the form of an actively damped two-mass vibration degree or a targated slipping clutch (or converter lock-up clutch), since the single also delivers the undesired engine rotation irregularity during corresponding damping and filtering.

What is claimed is:

1. A device for control of a transmission connected with an oscillatingly suspended drive mechanism for a motor vehicle, said device comprising:

an electronic transmission control for one of a shift pressure control of transmission clutches and a contact pressure control of a transmission variator as a function of an engine-torque equivalent signal transmitted by a sensor;

wherein said sensor is a piezo ceramic pressure transmitter situated on a torque support of the drive mechanism.

2. A process for controlling a device controlling a transmission connected with an oscillatingly suspended drive mechanism for a motor vehicle, said device comprising an electronic transmission control for one of a shift pressure control of transmission clutches and a contact pressure control of a transmission variator as a function of an engine-torque equivalent signal transmitted by a sensor; and said sensor being a piezo ceramic pressure transmitter situated on a torque support of the drive mechanism, the process comprising the steps of:

measuring, via said piezo ceramic pressure transmitter, a supporting force of said oscillating drive mechanism on the torque support as a function of time; and converting the measured supporting force, via calibration points, to a transmission input signal.

3. The process according to claim 2, further comprising the step of determining the calibration points by correlating discrete engine operation points based on at least engine rotational speeds and engine loads with the measured supporting forces developed therefrom; and associating the measured supporting forces with statically produced transmission input signals.

4. The process according to claim 2, further comprising the step of depositing the calibration points, in a performance graph of the electronic transmission control, as defined static engine operation points with known transmission input torques.

5. The process according to claim 4, further comprising the step of, when passing through the calibration points during a driving operation of the vehicle, taking control of the process via an alignment with the performance graph deposited in the electronic transmission control.

6. The process according to claim 5, further comprising the step of carrying out a long-term adaptation of the alignment.

7. The process according to claim 5, further comprising the step of receiving, via said electronic transmission control, the engine-torque equivalent signal in parallel with an engine torque signal from an electronic engine control.

8. The process according to claim 7, further comprising the step of aligning the known transmission input torque with the engine torque signal from the electronic transmission control.

9. The process according to claim 4, further comprising the step of evaluating the engine-torque equivalent signal after the known transmission input torque and after dynamic input torque change of the transmission.

10. The process according to claim 2, further comprising the step of targeting starting up of the vehicle, in a first initial operation mode, to determine the calibration points as defined static engine operation points with known transmission input torques; and depositing the calibration points in a performance graph of the electronic transmission control.

11. The process according to claim 2, further comprising the step of evaluating the engine-torque equivalent signal only after a dynamic torque change of the transmission.

12. The process according to claim 2, further comprising the step of using the engine-torque equivalent signal to calculate the contact pressure of the variator of a CVT of the vehicle.

13. The process according to claim 2, further comprising the step of using the engine-torque equivalent signal to calculate a circulation pressure for a converter lock-up clutch of the transmission.

* * * * *